(12) United States Patent
Cole (10) Patent No.: US 11,124,651 B2
(45) Date of Patent: Sep. 21, 2021

(54) POT HOLE FILLER COMPOSITION AND METHOD OF MAKING SAME

(71) Applicant: Gregory Cole, Garland, TX (US)

(72) Inventor: Gregory Cole, Garland, TX (US)

( * ) Notice: Subject to any disclaimer, the term of this patent is extended or adjusted under 35 U.S.C. 154(b) by 0 days.

(21) Appl. No.: 16/382,516

(22) Filed: Apr. 12, 2019

(65) Prior Publication Data
US 2019/0300715 A1    Oct. 3, 2019

Related U.S. Application Data

(60) Continuation-in-part of application No. 15/906,895, filed on Feb. 27, 2018, now Pat. No. 10,280,306, which is a division of application No. 15/296,109, filed on Oct. 18, 2016, now Pat. No. 9,938,409, which is a division of application No. 14/812,523, filed on Jul. 29, 2015, now Pat. No. 9,518,183.

(60) Provisional application No. 62/031,327, filed on Jul. 31, 2014.

(51) Int. Cl.
| | |
|---|---|
| *E01C 19/10* | (2006.01) |
| *C08L 95/00* | (2006.01) |
| *E01C 7/18* | (2006.01) |
| *E01C 23/06* | (2006.01) |
| *E01C 11/00* | (2006.01) |
| *C08L 21/02* | (2006.01) |
| *C08L 87/00* | (2006.01) |

(52) U.S. Cl.
CPC ............. *C08L 95/005* (2013.01); *C08L 21/02* (2013.01); *C08L 87/00* (2013.01); *E01C 7/187* (2013.01); *E01C 11/005* (2013.01); *E01C 19/10* (2013.01); *E01C 19/1072* (2013.01); *E01C 19/1077* (2013.01); *E01C 23/06* (2013.01); *C08L 2205/03* (2013.01); *C08L 2555/52* (2013.01); *C08L 2555/60* (2013.01); *C08L 2555/80* (2013.01)

(58) Field of Classification Search
CPC ................................................. E01C 19/1045
USPC .......................... 366/34, 325.4, 177.1, 181.1
See application file for complete search history.

(56) References Cited

U.S. PATENT DOCUMENTS

| | | | | | |
|---|---|---|---|---|---|
| 1,524,854 | A | * | 2/1925 | Browne | ............... E01C 19/1045 366/67 |
| 1,546,335 | A | * | 7/1925 | Browne | ............... E01C 19/1045 366/34 |
| 1,546,336 | A | * | 7/1925 | Browne | ............... E01C 19/1045 366/35 |
| 1,781,435 | A | * | 11/1930 | Carper | ..................... B01F 5/104 241/97 |
| 2,445,741 | A | * | 7/1948 | Franz | ....................... B01J 19/18 422/163 |
| 3,030,193 | A | * | 4/1962 | Marullo | ................... B01J 19/18 422/205 |
| 3,378,235 | A | * | 4/1968 | Udy | ........................ C06B 21/00 366/154.2 |

(Continued)

*Primary Examiner* — David L Sorkin
(74) *Attorney, Agent, or Firm* — Braxton Perrone, PLLC; Bobby W. Braxton; Gregory Perrone (57) ABSTRACT

A system and method for filling pot holes. The system includes transferring aggregate from an aggregate tank. Activator is likewise transferred from an activator tank. The activator is mixed with the aggregate to form a homogenized mixture. A liquid is introduced into a homogenized mixture to form a slurry and then a pot hole filler. The pot hole filler is directed through an exit end of a mixing tube.

4 Claims, 8 Drawing Sheets

(56) References Cited

U.S. PATENT DOCUMENTS

| | | | | | |
|---|---|---|---|---|---|
| 3,415,493 | A | * | 12/1968 | Bates | B29B 7/38 |
| | | | | | 366/304 |
| 3,924,837 | A | * | 12/1975 | Knis | B29B 7/405 |
| | | | | | 366/98 |
| 3,930,535 | A | * | 1/1976 | Menzel | A23G 9/20 |
| | | | | | 165/254 |
| 4,087,079 | A | * | 5/1978 | Kramer | B01F 7/02 |
| | | | | | 366/131 |
| 5,609,831 | A | * | 3/1997 | Kempter | B01F 7/18 |
| | | | | | 422/135 |
| 9,518,183 | B2 | * | 12/2016 | Cole | C08L 87/00 |
| 9,938,409 | B2 | * | 4/2018 | Cole | C08L 87/00 |
| 10,280,306 | B2 | * | 5/2019 | Cole | C08L 87/00 |

\* cited by examiner

POT HOLE FILLER COMPOSITION AND METHOD OF MAKING SAME

PRIORITY

This application is a continuation-in-part of U.S. Ser. No. 15/906,895 filed Feb. 27, 2018 which is divisional of U.S. application Ser. No. 15/296,109, filed Oct. 18, 2016, the entirety of which is hereby incorporated by reference, and the '109 application is a divisional of application Ser. No. 14/812,523 filed on Jul. 29, 2015, now U.S. Pat. No. 9,518,183, which claims priority to provisional application No. 62/031,327 filed Jul. 31, 2014, the entirety of which is hereby incorporated by reference.

BACKGROUND OF THE INVENTION

Technical Field

The present invention relates to a system and composition for filling pot holes.

Description of Related Art

Roads today face increased traffic from increasingly heavier vehicles. This fact, combined with the extreme temperature conditions, result in roads which crack or form pot holes. Often these pot holes are filled with a labor intensive hot-fill product which must be heated before filling the pot hole. Many of these prior art pot hole fillers lack the durability to withstand the extreme road and weather conditions. Consequently, there is a need for a superior pot hole filler.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Several embodiments of Applicant's invention will now be described with reference to the drawings. Unless otherwise noted, like elements will be identified by identical numbers throughout all figures. The invention illustratively disclosed herein suitably may be practiced in the absence of any element which is not specifically disclosed herein.

Figure 1:
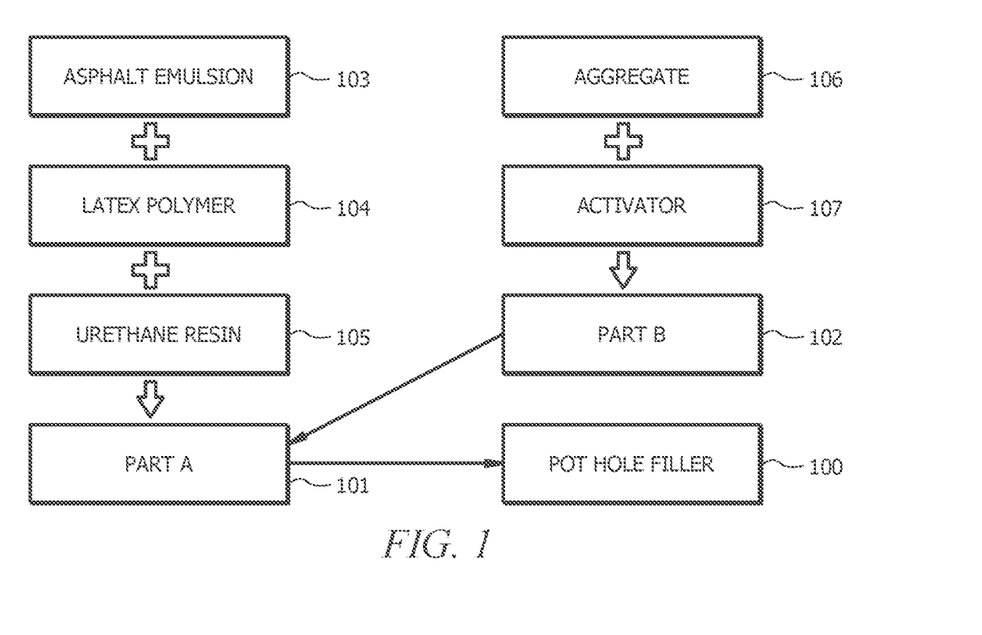
FIG. 1 is a flow chart of a method of making a pot hole filler in one embodiment.

FIG. 1 is a flow chart of a method of making a pot hole filler in one embodiment. As depicted, in one embodiment at least three ingredients are added to form a Part A 101, and at least two ingredients are added to form a Part B 102. In one embodiment, as will be discussed in more detail below, the Part B 102 is added to Part A and mixed creating a pot hole filler 100. In one embodiment Part A comprises an aqueous solution whereas Part B comprises a pourable solid.

The relative amounts of each ingredient can be altered depending upon the application, the temperature during application, etc. One embodiment will be discussed wherein the ingredients fit within a 5 gallon bucket. A 5 gallon bucket is a common size which will fill many common pot holes. While a 5 gallon bucket will be described, this is for illustrative purposes only and should not be deemed limiting. The ingredients can be scaled larger or smaller, depending upon the desired application. As used herein, the term "bucket" refers to any container which can hold ingredients. In one embodiment, the bucket stores, holds, and serves as the location for the mixing and dispensing of the pot hole filler 100. A bucket can include a traditional bucket, such as a 5 gallon bucket, a hopper, a storage tank, a pipe, etc.

Returning back to FIG. 1, one ingredient of Part A 101 is an asphalt emulsion 103. As used herein, "asphalt" refers to the aqueous substance commonly used in road construction, and includes any asphalt bottoms fraction, as well as naturally occurring asphalts, tars and pitches. The asphalt emulsion 103 can comprise any water-based colloid manufactured asphalt emulsion. In one embodiment, the asphalt emulsion 103 comprises an anionic water-based colloid manufactured asphalt emulsion. An anionic asphalt is more stable and has a longer shelf life compared to a cationic asphalt. Further, humidity during and after application is less of a factor with anionic asphalt compared to cationic asphalts which will dry with high humidity and will thereafter break on a hot day. In one embodiment, the asphalt emulsion 103 is water soluble and comprises a viscosity of between about 10-100 cps. In one embodiment the asphalt emulsion 103 comprises a viscosity of about 27 cps. In one embodiment the asphalt emulsion 103 does not comprise any VOC.

A second ingredient in Part 101 is the latex polymer 104. The latex polymer modifies the asphalt to change its physical characteristics from being sticky to having a non-tack surface, without hindering the adhesion ability to bond. In one embodiment, the presence of the latex polymer 104 allows the Part A 101 material to react with the activator 107 in a homogeneous dehydration process. The latex polymer 104 allows the asphalt to "set" as a pot-hole filler. A variety of latex polymers 104 can be utilized, including but not limited to, an aqueous colloidal dispersion. Those skilled in the art will understand other suitable latex polymers 104.

The asphalt emulsion 103 and the latex polymer 104 can be mixed together in any order. The exact ratios of asphalt emulsion 103 to latex polymer 104 will vary depending upon the specific asphalt 103 and polymer 104 utilized. In one embodiment the ratio of asphalt emulsion 103 to latex polymer 104 is about 1.4:1 to about 1.1:1.

The third ingredient of Part A 101, in one embodiment, is urethane resin 105. The urethane resin 105, in one embodiment, comprises virtually any polyurethane dispersion. In one embodiment the urethane resin is an anionic urethane latex aqueous emulsion of fully redacted polyurethane. In one embodiment, no solvent is present in the urethane resin. In one embodiment the polyurethane comprises no free isocyanate. In one embodiment the urethane resin comprises a viscosity of less than 150 cps at 25° C. Other anionic resins and reactive polymers can also be used. In one embodiment the urethane resin 105 comprises an aromatic resin.

The urethane resin 105 has several benefits. First, it affects the viscosity of the pot hole filler 100. Too much urethane resin 105 results in a pot hole filler 100 which is undesirably too thick. Further, the urethane resin 105 decreases or prevents phase separation in Part A 101. Without the urethane resin 105, the liquid in Part A will phase separate over time. This is unseemly to consumers. Further, after phase separation occurs, the liquid in Part A must be thoroughly mixed prior to usage. However, Applicants have discovered that the urethane resin 105 prevents or decrease the phase break in Part A 101. Rather, the urethane resin 105 keeps the solution in Part A as a thoroughly mixed solution. As such, the solution is viewed more favorably by consumers, and the solution does not have to be mixed, or mixed as vigorously prior to use.

The amount of urethane resin 105 added is dependent upon several factors including the ratios and grade of the other ingredients in the pot hole filler 100. In one embodiment the urethane resin 105 comprises between about 0.1 to about 0.4% by weight of the pot hole filler 100. In another embodiment, the urethane resin 105 comprises between about 0.2 to about 0.25% by weight of the pot hole filler 100. Such amounts decrease or eliminate the phase separation of Part A 101 while not undesirably altering the viscosity.

In one embodiment a neoprene or latex resin is used in lieu of a portion of the urethane resin. A latex acrylic resin in often much less expensive than a urethane resin. In some embodiments, from about 25% to about 40% of the urethane resin is replaced with a latex resin. This results in less expensive ingredients, but the end product does not suffer. In one embodiment whereby 40% of the urethane resin was replaced with a latex resin, the resulting pot hole filler set in about 6 hours. In another embodiment whereby 25% of the urethane resin was replaced with a latex resin, the resulting pot hole filler set in 15 minutes. Thus, there are advantages for replacing a portion of the urethane resin with a latex resin.

The latex resin softens the product. Accordingly, in some embodiments the activator 107, discussed in more detail, can be adjusted. While in some embodiments with a urethane resin utilizes calcium sulfate, the activator 107 can be adjusted to include sodium metasilicate pentahydrous. In one embodiment, the activator 107 comprises a 1 part sodium metasilicate pentahydrous to 2 parts calcium sulphate.

There are a number of additional ingredients that can be added to Part A 101 or Part B 102. As but one example, in one embodiment glycol is added to Part A 101. Glycol softens the product and allows the product to be used at lower temperatures. In one embodiment the glycol comprises 5-15% of Part A.

Turning to Part B 102, one ingredient, in one embodiment of Part B 102, is the aggregate 106. An aggregate 106 is a substance which offers structure and density to the product. In one embodiment, the aggregate 106 comprises any aggregate which stays suspended in a solution. Examples of aggregate 106 includes sand, plastic chips, walnut shells, pumice, crumb rubber and brick chips. One example will be discussed wherein the aggregate 106 comprises pumice, but this is for illustrative purposes only and should not be deemed limiting.

Pumice is a textural term describing a group of siliceous materials which are formed from lava. In one embodiment, pumice comprises a powdered or dust form. As used herein, the term "pumice" refers to and natural pumice, reticulite and scoria, or combinations thereof. Natural pumice is a lightweight, highly microvesicular form of igneous rock with a typical apparent density as low as 0.64 g/cc and 90% porosity. Natural pumice is formed during a volcanic eruption when molten lava is subjected to an abrupt change in pressure. The gas trapped in the lava expands and forms bubbles. The gas bubbles cause the lava to foam, and when this foam cools rapidly, natural pumice is formed. Natural pumice is typically composed of 50 to 80% $SiO_2$, and due to rapid cooling, has a glassy, non-crystalline structure. Reticulite is a type of pumice formed from basaltic magma, but unlike natural pumice, most of the microvesicles burst during the formation process, forming a honeycomb like structure. Scoria forms from the crust floating on basaltic or andesitic lava. Scoria cools at a slower rate than typical natural pumice and is, consequently, crystalline and more dense.

In one embodiment, the aggregate 106 is particulate, with typical particle size range being from about 10 mesh to about 100 mesh. In one embodiment comprising pumice, the pumice aggregate 106 has a grade from about 1 to 10, depending on the desired finish material utilized. In one embodiment, if a harder finished material is desired then a 1 or 2 grade pumice is utilized, whereas for a softer finished material a grade 5 or greater pumice is utilized.

A second ingredient in Part B 102, in one embodiment, is the activator 107. The activator 107 can comprise salt, salt derivative, or Lyme. In one embodiment the activator 107 comprises calcium sulfate. In another embodiment the activator 107 comprises anhydrous calcium sulfate. The activator 107 affects the rigidity and the set up time of the pot hole filler 100. For example, in one embodiment comprising anhydrous calcium sulfate, when water present in Part A contacts the anhydrous calcium sulfate, a hydration reaction occurs. The calcium sulfate reacts with the water to form calcium sulfate dihydrate. The dihydrate molecule is larger and chemically more stable than the calcium hydrate without the water of hydration (*$nH_2O$). The reaction is exothermic. Larger crystals form which grown into each other. It is, in part, the interlocking of these crystals together which causes the pot hole filler 100 slurry to harden into a solid, durable mass.

As noted, the hardness of the set up pot hole filler 100 as well as the set up time, is a function, in part, of the amount and grade of the aggregate 106 and activator 107 which is utilized. When temperatures at the time of application are below about 80° F., the set up time increases. Put differently, at lower temperatures the compositions take longer to set up. As used herein, "set up" refers to the time the pot hole filler 100 has sufficiently hardened so as to be traffic ready. To counteract the lower temperatures and the accompanying increased set up time, in one embodiment, additional activator 107 can be utilized. As but one example, consider the below formulations for an 850 cubic inch yield, utilizing grade 5 pumice as the aggregate 106 and anhydrous calcium sulfate as the activator 107:

| Temperature | Amount of Anhydrous Calcium Sulfate |
| --- | --- |
| Above 80° F. | 200 grams |
| 50° F. to 80° F. | 250 grams |
| 30° F. to 50° F. | 300 grams |
| 10° F. to 30° F. | 350 grams |

The above table is for illustrative purposes only and should not be deemed limiting.

The final pot hole filler 100 composition can vary depending upon the relative amounts of all the ingredients. In one embodiment the pot hole filler 100 comprises about 15% to about 60% by weight asphalt emulsion 103, about 20% to about 60% by weight latex polymer 104, about 10% to about 60% by weight aggregate 106, about 0.01% to about 0.5% by weight resin 105, about 0% to about 0.5% by weight activator 107. In another embodiment the pot hole filler 100 comprises about 20% to about 49% by weight asphalt emulsion 103, about 30% to about 50% by weight latex polymer 104, about 17% to about 50% by weight aggregate 106, about 0.2% to about 0.25% by weight resin 105, about 0.09% to about 0.38% by weight activator 107.

While the composition in one embodiment has been described, the method of application, in one embodiment will now be described. In one embodiment utilizing a 5 gallon bucket, the Part A 101 portion is stored within a bladder. A bladder is any bag, sack, bottle, or container which is suitable for storing liquids. In one embodiment the bladder Part B 102 is also stored within a sack, bag, or container such that Part B can be removed. Thus, in one embodiment both Part A and Part B are stored within the same bucket.

To make the pot hole filler 100 in one embodiment, both Part A 101 and Part B 102 are removed from the bucket. Part A 101 is then opened, via any opening known in the art, and added to the bucket. Thereafter, Part B 102 is opened and mixed with Part A 102. Mixing Part B 102 into Part A 101 provides a more thorough blending than if Part A 101 were mixed with Part B 102.

Once Part A 101 and Part B 102 are both added to the bucket, they are mixed. Part A 101 and Part B 102 can be mixed by hand or by any conventional mixing tools such as a power mixer. If mixed by hand using a stir stick as the mixer, the ingredients can be mixed, in one embodiment, in about 30-45 seconds. The stir stick can comprise any item which mixes ingredients, but in one embodiment comprises a 1" by 4" by 3" wooden stir stick. In one embodiment, the mixture is mixed until it appears to be homogenous. The consistency, in one embodiment, will appear thin and runny.

After mixing the solution, the pot hole filler 100 is applied to the pre-prepared desired area. The pot hole filler 100 is poured into the desired area. Due, in part, to the consistency of the pot hole filler 100, in one embodiment, the pot hole filler 100 is self-leveling. Accordingly, the pot hole filler 100 will obtain an approximately level surface.

While one method and system utilizing only Parts A and B has been described, in other embodiments the system and method comprises Parts A, B, and C. For example, in one embodiment, the activator 107 is not part of Part B, but is instead Part C. This allows the user to control the quantity of the activator 107 added. Thus, in one embodiment, the activator 107 is not premixed with Part B. In such embodiments, the user will mix Part B into Part A as previously discussed, but will require the further step of adding Part C. Part C can be added to Part B before Part B is added to Part A, or Part C can be added after Part B has already been added.

As described above, in one embodiment, a method has been described which does not require additional heat. This is a strong advantage in that heavy and expensive equipment is not necessary during the application. Rather, the pot hole filler 100 can be applied by hand, without additional heat.

In one embodiment, the final asphalt is flexible, yet rigid, water-impervious, and UV and ozone resistant. In one embodiment the asphalt is fire resistant and comprises non-burning properties. Further, in one embodiment the asphalt comprises lower heat absorption compared to prior art asphalt products.

The final pot hole filler 100 has a multitude of uses. The pot hole filler 100 can be used for waterproofing, for sealing in the roofing and road industries, as a fill material in expansion joints and pot holes. Further, the pot hole filler 100 can be used as an insulating fill and fire resistant fill in many different industries, including in the wood or metal composite industries.

While one embodiment of using a bucket to hold and transfer the pot hole filler 100 has been described, this is for illustrative purposes and should not be deemed limiting. In other embodiments the pot hole filler 100 is applied via a machine. In such embodiments, the ingredients can be stored in bulk, which could otherwise exacerbate any phase separating issues which the urethane resin 105 overcomes. The machine can use any method or device to mix and deliver the pot hole filler 100. In one embodiment, because of the mechanical mixing capabilities, Part A is added to Part B prior to applying the pot hole filler 100. The machine can have additional capabilities such as a leveler, primer, blower, release agent, cleaning system, etc.

Figure 2:
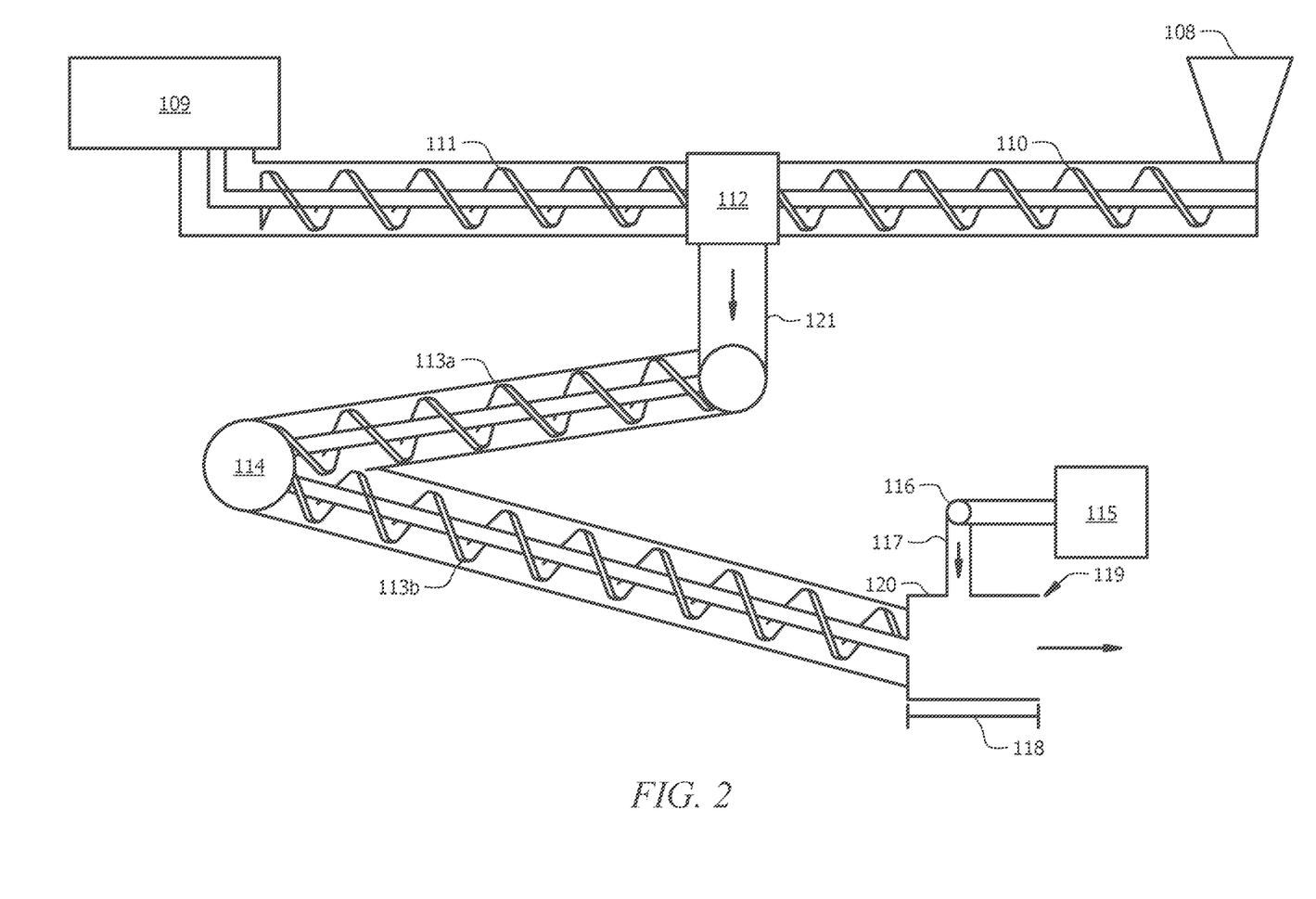
FIG. 2 is a schematic for an apparatus for making a pot hole filler in one embodiment.
Figure 3:
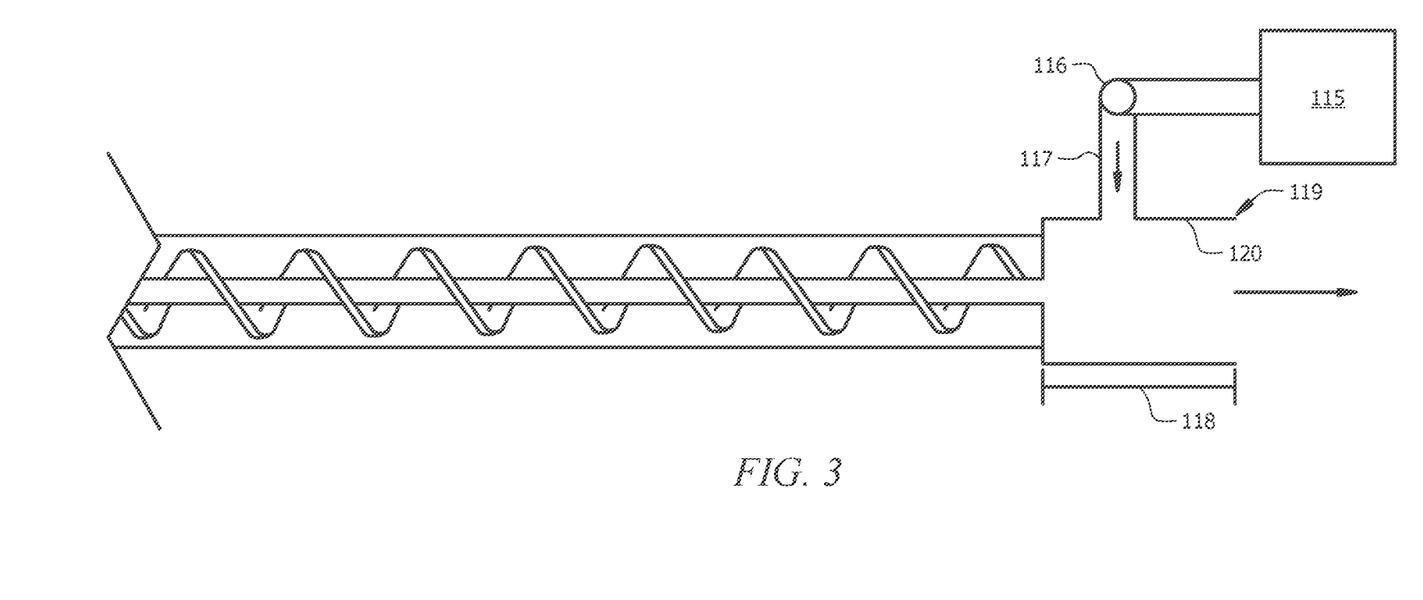
FIG. 3 is an enlarged schematic for the apparatus depicted in FIG. 2.

FIG. 2 is a schematic for an apparatus for making a pot hole filler in one embodiment. FIG. 3 is an enlarged schematic for the apparatus depicted in FIG. 2. FIG. 2 shows an apparatus which mixes two solids together and subsequently introduces a liquid to form a pot hole filler 100. This is for illustrative purposes only and should not be deemed limiting.

Depicted at the top of FIG. 2 is an activator tank 109. The activator tank 109 can comprise any container, hopper, or tank which can hold a volume of activator 107. The activator 107 housed in the activator tank 109 can comprise any activator 107 discussed herein.

The activator tank 109 is fluidly connected to an activator auger 111. As used herein an "auger" refers to any object which can move a solid such as a powder. The auger can include a pump, a rotating blade, air pressure, etc. The size and rotation speed of the auger will depend upon the type of material being moved as well as the volume of the material being transferred. The activator 107 can be transferred via any method or device known in the art. As noted, in one embodiment an auger, pump, gravity, etc. can be used.

FIG. 2 also depicts an aggregate tank 108. An aggregate tank 108, in one embodiment, houses aggregate 106. Any aggregate 106 discussed herein can be used. In some embodiments the aggregate tank 108 houses aggregate 106 as well as other additional substances.

The aggregate tank 108, as depicted, is fluidly connected to an aggregate auger 110. The aggregate auger 110 transfers a desired amount of aggregate 106 from the aggregate tank 108 to a solids valve 112. The solids valve 112 comprises a mixing chamber wherein two different streams are mixed and joined together to form a single stream. The solids valve 112 can comprise a stationary fitting such as a T-shaped fitting. Further, the solids valve 112 can comprise a valve, such as a three way valve, whereby the flow of one or more materials can be stopped and/or adjusted.

As can be seen in FIG. 2, the two streams of the aggregate 106 and the activator 107 are joined together to form a single stream. In one embodiment, this single joined stream is similar to the Part B 102 depicted in FIG. 1. The single stream can leave the solids valve 112 via any method known in the art including via pumping, solids transfer, pumping, an auger, or via gravity.

Once the two separate streams are joined, they flow through a single stream tube 121. In one embodiment the streams flow via gravity through the single stream tube 121, but in other embodiments a pump, auger, etc. can be utilized. After the single stream tube 121, the stream is moved via a solids auger 113. The solids auger 113 has two functions. First, the solids auger 113 delivers and transfers the mixed material. Second, the solids auger 113 acts to mix and homogenize the two streams.

As depicted, the solids auger 113 has a pivot 114. A pivot 114 is point about which the auger can rotate. As depicted the pivot 114 allows the solids auger 113 to be rotated in the vertical direction. In other embodiments the pivot 114 allows the auger 113 to be rotated in the horizontal direction. One or more pivots 114 can be used to such that the exit end 119 of the apparatus can be adjusted and directed to the desired location. In one embodiment the exit end 119 can be adjusted in two or more dimensions. In one embodiment the single stream tube 121 is adjacent to a pivot which couples to the solids auger 113.

The exit end 119 of the apparatus is the end through which pot hole filler 100 exits the apparatus. The exit end 119 is downstream of the solids auger 113. As used herein, upstream and downstream refer to relative locations in the process and on the apparatus. The solids auger 113 is upstream of the exit end 119 and is downstream from the solids valve 112.

Upstream from the exit end 119 is the liquid inlet 117. This is the point at which a liquid is introduced into the homogenized mixture to form a pot hole filler. The liquid is introduced through a liquid inlet 117 located a mixing length 118 from the exit end of a mixing tube 120. The mixing tube 120 can comprise any tube, pipe, or container into which a liquid can be mixed with a solid to form a pot hole filler. In one embodiment the mixing tube 120 comprises piping through which the pot hole filler 100 can be directed. In one embodiment the mixing tube 120 is hollow whereas in other embodiments the mixing tube 120 comprises mixing equipment to aid in the mixing.

The mixing length 118 can vary depending upon the flow rate of the exiting pot hole filler 100, the size of the auger 113, and the ratio of the liquid to the solids. In one embodiment, for an auger of about 3-5 inches, and for a flow rate of approximately 4 gallons per minute, the mixing length 118 ranges from about 5 inches to about 12 inches. In one embodiment the mixing length 118 is about 8 inches. In one embodiment the mixing length 118 is the length required to ensure approximate homogenous dispersion of the liquid into the pot hole filler 100.

The liquid can comprise a variety of liquids as discussed above. In one embodiment the liquid comprises an asphalt emulsion 103. In one embodiment the liquid formation which is injected at the liquid inlet 117 comprises a formula similar to Part A 101 discussed above. Accordingly, in one embodiment, the liquid comprises an asphalt emulsion 103, a latex polymer 104, and a urethane resin 105. The liquid can be mixed and prepared as discussed above.

The liquid, in one embodiment, is stored in a liquid tank 115. The liquid is directed from the liquid tank 115 via a pump 116 or other such device into the liquid inlet 117. As noted virtually any device to move liquid including a pump, pressure such as air pressure, gravity, or other fluid moving devices or methods can be utilized.

In one embodiment, the liquid is pre-mixed and then introduced into the liquid tank 115. In one embodiment, the liquid tank 115 has an agitator, recirculating pump, or other such device which keeps the liquid properly mixed.

Those skilled in the art will understand the various control systems and equipment which can be utilized to control and operate the apparatus which can perform the method discussed above. This control equipment can include, but is not limited to, sensors, flow-rate sensors, weight sensors, servos, pumps, augers and auger motors, adjustable valves, etc. The flow rate of pot hole filler 100 produced will be dependent upon many factors including the size of the apparatus. In one embodiment the apparatus is sized to produce between 3-5 gallons of pot hole filler 100 per minute.

In one embodiment, to reach a desired flow rate of pot hole filler 100 through the exit end 119, a desired amount of one ingredient is specified and the remaining ingredients are adjusted to maintain the desired proportions. As but one non-limiting example, in one embodiment the amount of aggregate 106 from the aggregate tank 108 is set. Thereafter, the amount of activator 107 and liquid is adjusted to reach the desired proportions. Accordingly, if the user desires to increase the flow rate of pot hole filler 100, the flow rate of aggregate 106 is increased. This causes the amount of activator 107 and liquid to likewise be increased. In still other embodiments the amount of liquid and/or activator 107 is set and the amount of other ingredients is adjusted to maintain the desired ratios. Note while in some embodiments these adjustments occur automatically, in other embodiments these adjustments can take place manually. In still other embodiments, even if the adjustments occur automatically, they can still be overridden manually.

As but one example, in one embodiment comprising a 3 inch auger, the speed of the rotation of the auger from the aggregate tank 108 is set between about 90 and 120 RPM. If the rate of the aggregate is desired to increase, the RPM on the auger can be adjusted from 90 RPM to 120 RPM.

As but one non-liming example, in one embodiment the rate of aggregate is set and the amounts and rates of the emulsion and the activator are adjusted accordingly. As noted, the set time, the temperature, the slope, etc. are all factors which can result in adjusting the ratios of the ingredients. In one embodiment the aggregate 106 is set at 120 RPM with a flow rate of about 25.7 pounds per minute. The emulsion 101 can range, in one embodiment between 120 and 170 RPM with a resulting flow rate of between 20 to 27.2 pounds per minute. The activator 107 can range from 80 to 160 RPM and from about 1.5 to 3 pounds per minute. A lower percentage of activator will result in a slower set time whereas a higher amount of activator will result in a faster set time.

In one embodiment the apparatus and method utilize a release agent. A release agent, as used herein, refers to a material which prevents or decreases the product from adhering to the equipment. Any point downstream of the liquid inlet 117 is subject to gumming or fouling due to the pot hole filler 100 adhering to the surface of the equipment. This includes augers, the mixing tube 120, the exit end 119, and any tools such as brooms, shovels or squeegees which may come into contact with the pot hole filler 100 and/or the slurry mix. The slurry mix is the mixture of the liquid and solid parts prior to it sufficiently mixing. Once the slurry mix sufficiently mixes, it exits through the mixing tube 120 and becomes pot hole filler 100.

Because, in some embodiments, the pot hole filler 100 hardens, removing the product from the surface of the equipment after it hardens is often very difficult. Accordingly, in one embodiment a release agent prevents the product from adhering. A release agent can comprise any material which decreases the adhesion on the equipment surfaces. In one embodiment the release agent comprises a saline water solution. The salt can comprise any salt, but in one embodiment comprises calcium chloride. In one embodiment calcium chloride is mixed with water in a ratio of between 1:5 and 1:10. The resulting solution can be sprayed onto the surfaces of equipment which comes into contact with the pot hole filler 100.

As noted, in some embodiments the release agent comprises an external fluid which is sprayed, dipped, or otherwise applied to the surface of equipment which comes into contact with the pot hole filler 100. In other embodiments, the release agent comprises a permanent coating, such as Teflon, which reduces the adherence of the product to the equipment.

In one embodiment the apparatus and method discussed above requires no external heat. As noted, this is a benefit because it reduces the complexity of the apparatus. Instead, the materials are mixed, as discussed above, and then applied to the desired location.

Figure 4:
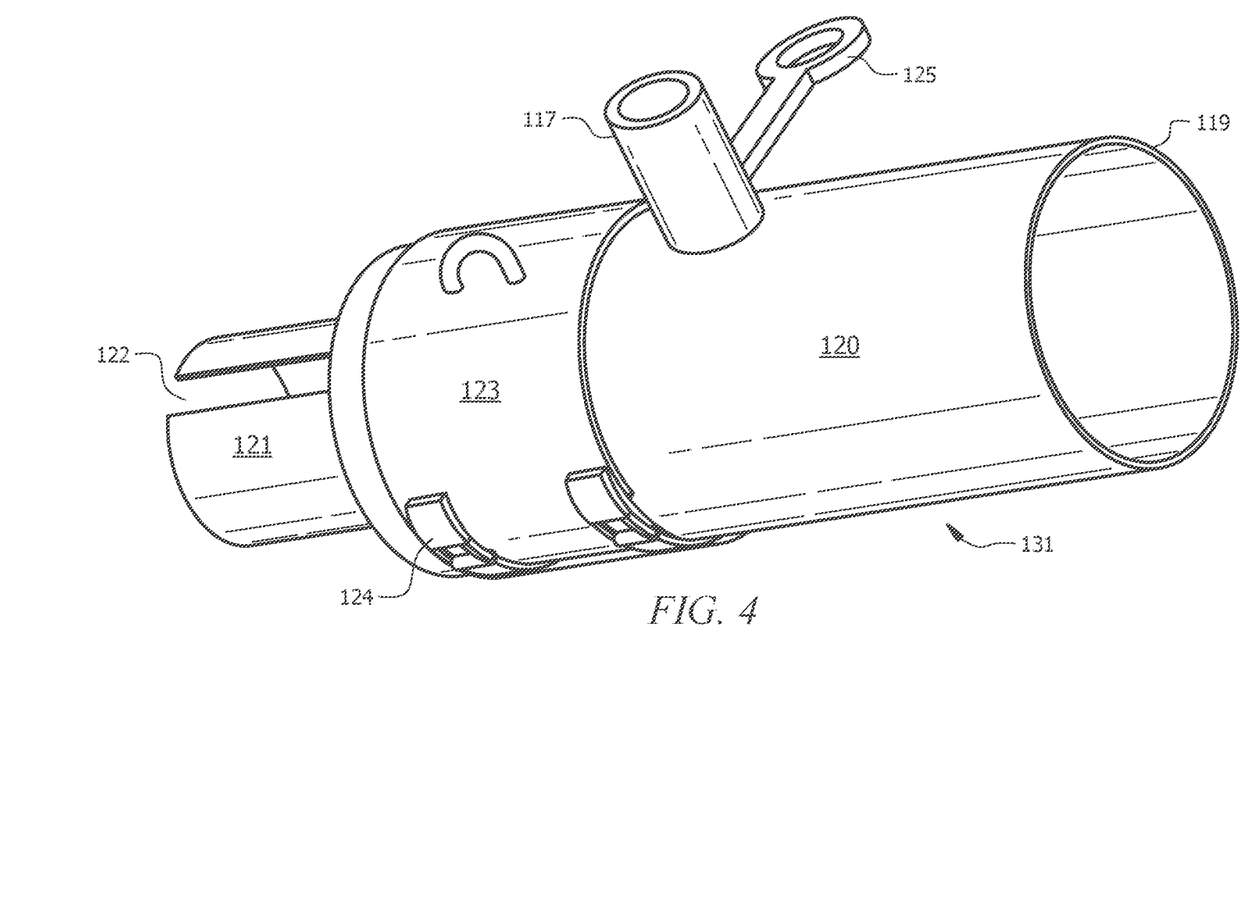
FIG. 4 is a perspective view of a mixing head in one embodiment.

FIG. 4 is a perspective view of a mixing head in one embodiment. The mixing head 131 is the unit which is on the downstream end of the system. The pot hole filler 100 is mixed and exits through the mixing head 131.

In one embodiment the mixing head 131 comprises a mixture of nickel and chrome. In one embodiment the entire head 131 is made of nickel and chrome, whereas in other embodiments the internal surface of the head 131 comprises nickel and chrome. This reduces the buildup of material on the head 131.

The liquid inlet line 117 introduces liquid into the mixing head 131 as previously discussed. Solid material, namely Part B of FIG. 1, pushed by the solids auger 113, is introduced through the open upstream end of the mixing head 131. The solids and liquids are mixed downstream of the liquid inlet 117 in the mixing tube 120. The mixing tube 120 is the portion of the mixing head 131 which is downstream of the liquid inlet 117.

In one embodiment the inlet line 117 is approximately perpendicular to the length of the head 131. In one embodiment the inlet line 117 is slightly angled so that the upstream angle is less than 90 degrees. This helps mix the liquid and solid streams. The upstream angle can vary, in one embodiment from about 30 to about 90 degrees.

The mixing head 131 is coupled to receive the solids from the solids auger 113 as previously described. In one embodiment the flow of the solids from the solids auger 113 entering the mixing head 131 is parallel with the length of the mixing head 131.

Upstream of the liquid inlet 117 is a cover 123. The cover 123 covers a void, which will be discussed in more detail below herein. As shown, the cover 123 is removable or partially removable to allow access to the below void. The cover 123 can have one or more hinges 124 which allow the cover 123 to either be removed or to rotate about the hinges 124 to provide access.

Upstream of the cover 123, and on the upstream end of the mixing head 131 is the collar 121. This is the portion 121 would couples the mixing head 131 with the solids supply. This can be directed via the solids auger 113 as previously described. The collar 121, in one embodiment, is coupled over a male coupling.

The collar 121, as depicted, comprises a slot 122. In some embodiments the upstream connector which couples to the collar 121 comprises a protrusion which is received by the slot 122. The protrusion engaging with the slot 122 prevents the mixing head 131 from rotating; without the slot 122 and the associated protrusion, the mixing head 131 often undesirably rotates.

In one embodiment the collar 121 is co-axially coupled with both the solids supply, as addressed previously, as well as a rotating device. The rotating device can be the solids auger 113 previously described, or it can comprise another source which imparts rotational force. In one embodiment the collar 121 houses a rotating shaft. Coupling the rotating shaft to a device other than the auger allows the rotation to be separately, and independently controlled. Thus, the shaft can rotate at a frequency more or less than the rotation of the auger.

Figure 5:
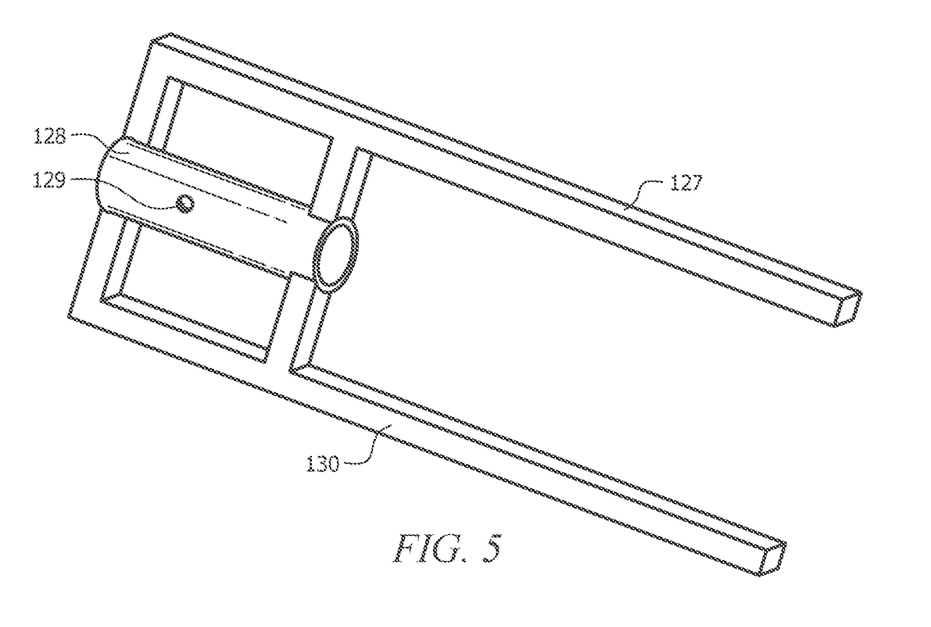
FIG. 5 is a perspective view of a mixer in one embodiment.

Turning to FIG. 5, FIG. 5 is a perspective view of a mixer in one embodiment. The mixer 127 mixes the solids and the liquids to form a pot hole filler 100. The mixer 127 comprises a central coupler 128 which couples the mixer 127 to an upstream shaft. As shown the coupler 128 comprises a connecting hole 129 whereby a bolt, pin, etc. can be inserted to couple the mixer to the upstream shaft. The mixer 127 can be coupled to the shaft via any method or device.

The mixer 127 further comprises blades 130 which extend beyond the coupler 128. As shown, the mixer 127 has two blades 130: an upper blade and an opposing lower blade. The blades 130 are positioned to be adjacent to the inner wall of the mixing tube 120. As seen, there is no blade which is not adjacent to the inner wall of the mixing tube 120. Put differently, there is no middle blade or other protrusion. This is a significant advantage. Having any protrusion, including either the shaft, the connector, or a middle mixing blade extending into the mixing tube 120, other than the mixing blades 130 located at the perimeter and adjacent to the mixing tube 120, results in product accumulating and sticking on the protrusion. This results in the mixing head 131 becoming plugged. The user would then have to remove the product from the head and stop the operation. By only having mixing blades 130 located at the perimeter and adjacent the mixing tube 120, and having no protrusions in the mixing tube 120 downstream of the liquid inlet 117, the mixing head 120 does not plug or clog. Accordingly, efficiency and speed is significantly increased.

Figure 6:
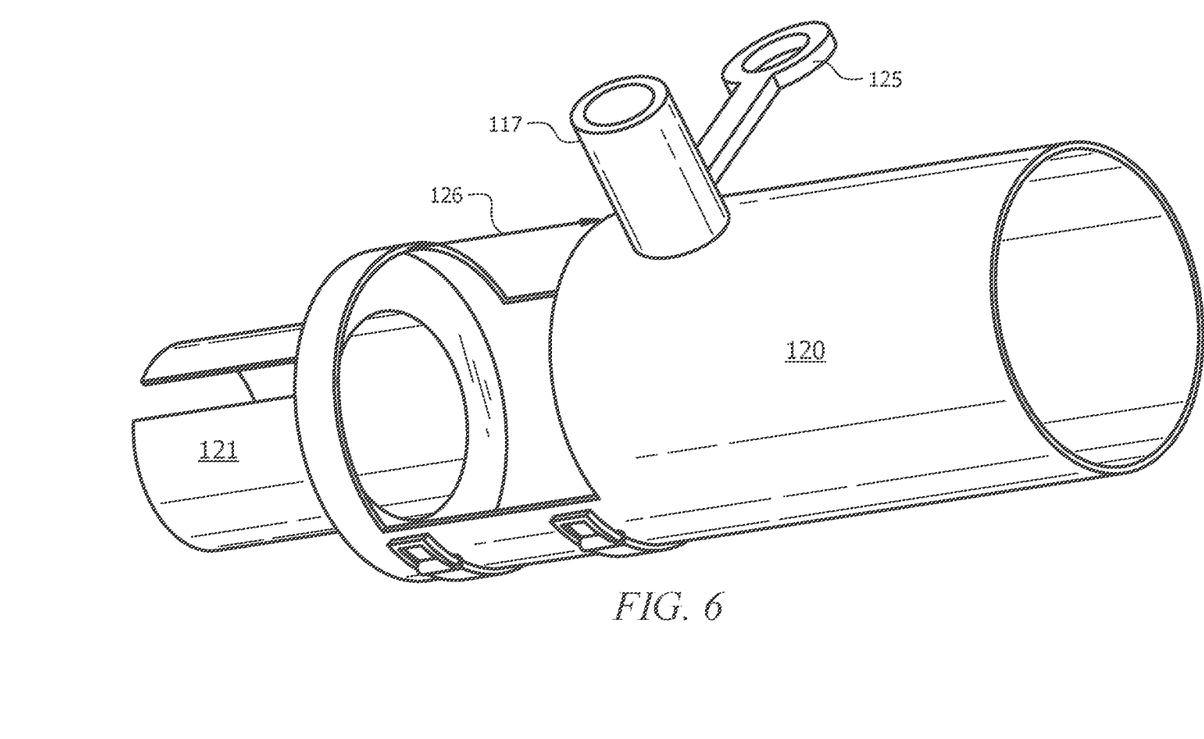
FIG. 6 is a perspective view of a mixing head with a cover removed in one embodiment.

FIG. 6 is a perspective view of a mixing head with a cover removed in one embodiment. As noted, with the cover 123 removed, the user has access to the internal void 126 below the cover. The void 126 allows a user or operator to adjust the coupling of the mixer 127 to the shaft. As noted, in one embodiment a shaft is inserted through the collar 121 and extends into the void 126. In one embodiment, as noted, the shaft does not extend downstream of the liquid inlet 127. The shaft extends into the void 126 whereby it can be coupled to the mixer 127. As noted, in one embodiment the user couples the mixer 127 via the connecting holes 129. In one embodiment the coupler 128 of the mixer 127 is hollow so as to receive the shaft. Thereafter, a bolt, pin, etc. is inserted through the connecting hole 129 to couple the mixer 127 to the shaft.

To install the mixer 127, the mixer 127 is inserted through the exit end 119 so that the coupler 128 engages the shaft. Via the void 126, a connecting device, such as a bolt or pin, then couples the coupler 128 with the shaft. The cover 123 is then closed. To decouple the mixer 127, the process is reversed.

Figure 7:
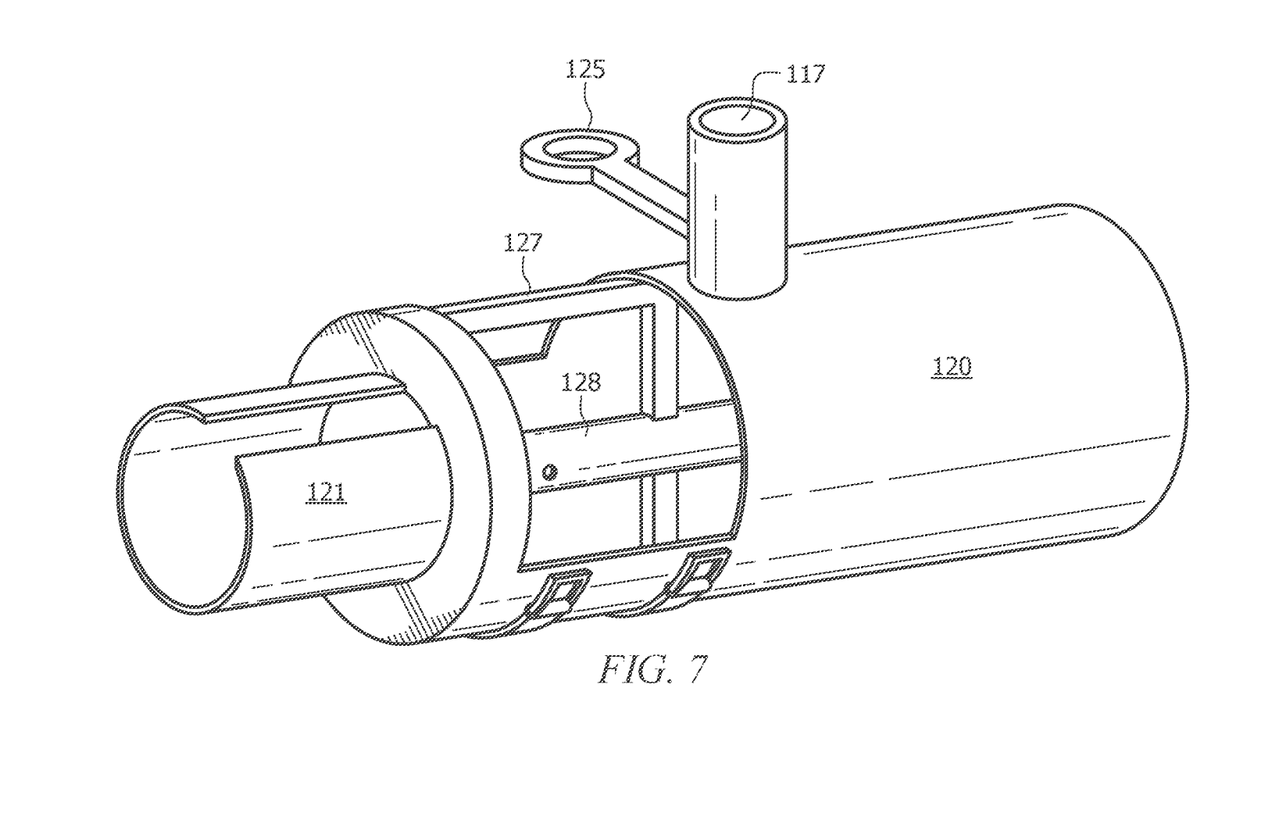
FIG. 7 is a perspective view of a mixing head with a cover removed in one embodiment.

FIG. 7 is a perspective view of a mixing head with a cover removed in one embodiment. As shown in FIG. 7, the mixer 127 has been inserted to a position wherein the coupler 128 is upstream of the liquid inlet 117. As noted, in one embodiment the coupler 128 comprises a hollow, centrally located, tube. When in the installed position, in one embodiment, the coupler 128 does not extend downstream of the liquid inlet 117. As noted, this prevents the head from becoming plugged.

Figure 8:
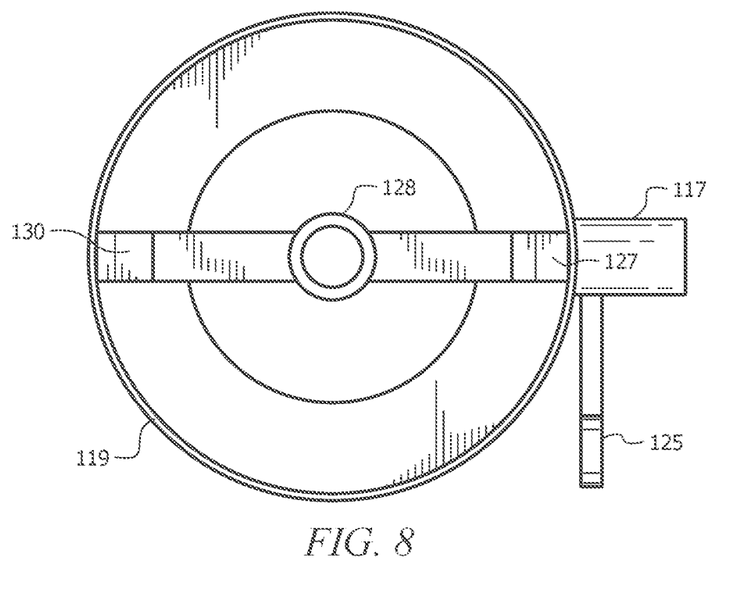
FIG. 8 is a perspective view of the exit end of a mixing head in one embodiment.

FIG. 8 is a perspective view of the exit end of a mixing head in one embodiment. As can be seen, the blades 130 are on the outer periphery and are adjacent to the inner wall of the mixing tube 120. Nothing, aside from the two blades 130 extend into the mixing tube 120 downstream of the liquid inlet 117.

As can be seen, the blades 130 will rotate causing a mixing of the solids introduced into the upstream opening of the head 131 with the liquids introduces through the liquid inlet 117.

As discussed, the head 131 discussed above has several advantages. First, because the shaft does not extend downstream beyond the liquid inlet 117, the potential for plugging along the shaft is reduced if not entirely eliminated. Second, because the coupler 128 couples to the shaft upstream of the liquid inlet 117, similar non-plugging benefits are also achieved. The head 131 can be used to spray pot hole filler 100 for hours on end without plugging. When finished, air or other liquids can be sprayed into the head 131 to clean its surfaces. Thereafter, the head 131 is ready for continued application.

Another benefit, previously discussed, is the slot 122 which prevents the head 131 from undesirably rotating. If the slot 122 and the accompanying protrusion is not present, the torque of the rotating shaft causes the head to rotate and cant. Preventing this rotation allows for more consistent application.

Another benefit is the reduction of plugging due to the materials used in the head. As noted, in one embodiment at least the internal surfaces of the head 131 are coated with chrome. This helps prevent the material from undesirably sticking on the head 131 surfaces. This results in increased usage of the head 131 without plugging.

In one embodiment the apparatus comprises a tracking system which keeps track of one or more ingredients. For example, the tracking system in one embodiment keeps track of how much asphalt has been used. This is beneficial in that the tracking system can keep track of how much ingredients and pot hole filler has been produced. This is helpful for warranty information. Further, this is a way to monitor that the apparatus has been using the correct formulation. If, for example, the apparatus reports twice as much asphalt as anticipated, either the pot hole filler being manufactured will be faulty, or incorrect or different ingredients are being used. In this way, if a machine is purchased or leased, the apparatus can monitor how the apparatus is being used as well as which and how much of each ingredient is used. If, for example, the owner of the apparatus requires that the renter of the apparatus buy the material from the owner, and the machine shows 1,000 gallons of asphalt has been used when only 500 gallons were purchased from the owner, then the owner knows the renter is using unauthorized materials.

The continuous apparatus and method discussed herein, in some embodiments, has several benefits over the batch method discussed above utilizing buckets. The first is increased throughput. In one embodiment the apparatus is sized so as to produce 4 gallons of pot hole filler 100 per minute. In one embodiment the apparatus can produce 500 gallons per tank, but this is for illustrative purposes only and should not be deemed limiting. The size of the storage tanks on the apparatus can be increased or decreased accordingly to obtain a desired max capacity of pot hole filler 100. Thus, a greater continuous volume of pot hole filler 100 can be produced compared to the 5 gallon buckets discussed above. Further, the apparatus and method requires minimal manpower compared to the manual buckets. Instead, the apparatus mixes and prepares the pot hole filler 100. Additionally, because the pot hole filler 100, in one embodiment, is delivered by an adjustable auger 113, the pot hole filler 100 can be accurately and safely deposited in the desired location. A user can simply guide the auger 113 to the desired location rather than lift and pour the pot hole filler 100 from a bucket.

Additionally, pot holes vary in size from, for example, one gallon to 100 gallons. The machine allows for less volume than what typically is made with a bucket.

While the apparatus, in some embodiments, has advantages over the buckets, in other embodiments, the buckets have an advantage. For example, if a single pot hole was going to be filled, it can be more efficient to use a single bucket. Likewise, the buckets do not require the purchase of an apparatus such as the one described above.

While the invention has been particularly shown and described with reference to a preferred embodiment, it will be understood by those skilled in the art that various changes in form and detail may be made therein without departing from the spirit and scope of the invention.

ADDITIONAL DESCRIPTION

The following clauses are offered as further description of the disclosed invention.

Clause 1. A system for producing a pot hole filler, said system comprising:
an aggregate tank comprising an aggregate;
an activator tank comprising an activator;
wherein said activator and aggregate are mixed to form a single solids stream in a single stream tube;
a liquid tank;
wherein said liquid tank directs liquid to mix with said solids stream in a mixing tube;
wherein said solids are introduced upstream from said liquids;
wherein a pot hole filler exits through an exit end of said mixing tube.

Clause 2. The system of any proceeding or preceding claim wherein said single solids stream is transferred via an auger.

Clause 3. The system of any proceeding or preceding claim wherein said liquid comprises an asphalt emulsion.

Clause 4. The system of any proceeding or preceding claim wherein said liquid comprises an asphalt emulsion, a latex polymer, and a urethane resin.

Clause 5. The system of any proceeding or preceding claim wherein external heat is not utilized.

Clause 6. The system of any proceeding or preceding claim wherein said asphalt emulsion is anionic, wherein said aggregate comprises pumice, wherein said pot hole filler comprises a pourable slurry, and wherein said pot hole filler comprises an asphalt emulsion to latex polymer ratio of between about 1.1:1 to 1.4:1.

Clause 7. The system of any proceeding or preceding claim wherein said mixing tube comprises
an internal hollow cavity;
an upstream end and a downstream end;
a liquid inlet in fluid communication with said hollow cavity; and
a cover located upstream from said liquid inlet.

Clause 8. The system of any proceeding or preceding claim wherein said mixing tube comprises a collar located upstream from said cover, wherein said collar comprises a reduced external diameter compared to an external diameter of said mixing tube, and wherein said collar comprises a slot.

Clause 9. The system of any proceeding or preceding claim wherein said mixing tube further comprising a mixer.

Clause 10. The system of any proceeding or preceding claim wherein said mixer comprises a coupler and at least one blade which extends downstream from said coupler, and wherein said at least one blade is adjacent to an inner diameter of said mixing tube.

Clause 11. The system of any proceeding or preceding claim wherein nothing other than said at least one blade extends into the mixing tube downstream of the liquid inlet.

Clause 12. The system of any proceeding or preceding claim wherein said coupler is aligned with said cover when said mixer is installed in said mixing tube.

Clause 13. A mixing tube comprising:
an internal hollow cavity;
an upstream end and a downstream end;
a liquid inlet in fluid communication with said hollow cavity;
a cover located upstream from said liquid inlet;
a collar located upstream from said cover.

Clause 14. The mixing tube of any proceeding or preceding claim wherein said collar comprises a reduced external diameter compared to an external diameter of said mixing tube, and wherein said collar comprises a slot.

Clause 15. The mixing tube of any proceeding or preceding claim further comprising a mixer.

Clause 16. The mixing tube of any proceeding or preceding claim wherein said mixer comprises a coupler and two blades, wherein said two blades are adjacent to an inner diameter of said mixing tube.

Clause 17. The mixing tube of any proceeding or preceding claim wherein nothing other than said two blades extend into the mixing tube downstream of the liquid inlet.

Clause 18. The mixing tube of any proceeding or preceding claim wherein said coupler is aligned with said cover when said mixer is installed within said mixing tube.

Clause 19. The mixing tube of any proceeding or preceding claim wherein said coupler couples to a rotating shaft, wherein said rotating shaft does not extend downstream from said liquid inlet.

Clause 20. The mixing tube of any proceeding or preceding claim wherein said mixing tube comprises chrome.

What is claimed is:

1. A mixing tube comprising:
an internal hollow cavity;
an upstream end and a downstream end;
a liquid inlet in fluid communication with said hollow cavity;
a cover located upstream from said liquid inlet;
a collar located upstream from said cover, wherein said collar is co-axially coupled with both a solids supply and a rotating shaft, wherein solids are introduced into said mixing tube by said solids supply at said collar upstream from said liquid inlet;
a mixer, wherein said mixer comprises a coupler for coupling with said rotating shaft and two blades, wherein said two blades are adjacent to an inner diameter of said mixing tube, and wherein nothing other than said two blades extend into the mixing tube downstream of the liquid inlet, and wherein the rotating shaft does not extend downstream of said liquid inlet.

2. The mixing tube of claim 1 wherein said collar comprises a reduced external diameter compared to an external diameter of said mixing tube, and wherein said collar comprises a slot.

3. The mixing tube of claim 1 wherein said coupler is aligned with said cover, and wherein mixing tube downstream of said liquid inlet has an inner diameter, and wherein said liquid inlet has an inner diameter, and wherein said inner diameter of said mixing tube downstream of said liquid inlet has a greater inner diameter than said liquid inlet.

4. The mixing tube of claim 1 wherein said mixing tube comprises chrome.

\* \* \* \* \*